United States Patent
Hopf et al.

(10) Patent No.: US 12,386,324 B2
(45) Date of Patent: Aug. 12, 2025

(54) METHOD AND DEVICE FOR TRAINING A DATA-BASED TIME DETERMINING MODEL FOR DETERMINING AN OPENING OR CLOSING TIME OF AN INJECTION VALVE USING A MACHINE LEARNING METHOD

(71) Applicant: Robert Bosch GmbH, Stuttgart (DE)

(72) Inventors: Andreas Hopf, Stuttgart (DE); Erik Tonner, Mehring (DE); Frank Kowol, Knittlingen (DE); Jens-Holger Barth, Fellbach (DE); Konrad Groh, Stuttgart (DE); Matthias Woehrle, Bietigheim-Bissingen (DE); Mona Meister, Renningen (DE); Roland Norden, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 369 days.

(21) Appl. No.: 18/001,546

(22) PCT Filed: Sep. 10, 2021

(86) PCT No.: PCT/EP2021/074944
§ 371 (c)(1),
(2) Date: Dec. 12, 2022

(87) PCT Pub. No.: WO2022/053620
PCT Pub. Date: Mar. 17, 2022

(65) Prior Publication Data
US 2023/0229121 A1   Jul. 20, 2023

(30) Foreign Application Priority Data
Sep. 11, 2020   (DE) .................... 10 2020 211 419.6

(51) Int. Cl.
*G05B 13/04*   (2006.01)
*F02D 41/14*   (2006.01)

(52) U.S. Cl.
CPC ........... *G05B 13/048* (2013.01); *F02D 41/14* (2013.01)

(58) Field of Classification Search
USPC .......................................................... 700/29
See application file for complete search history.

(56) References Cited

U.S. PATENT DOCUMENTS

| | | | | |
|---|---|---|---|---|
| 5,657,737 A | * | 8/1997 | Ishida | G05B 13/027 123/690 |
| 5,755,212 A | * | 5/1998 | Ajima | F02D 41/1405 123/674 |

(Continued)

FOREIGN PATENT DOCUMENTS

| | | | | |
|---|---|---|---|---|
| DE | 10255364 A1 | * | 10/2003 | ............. F02D 41/14 |
| DE | 10331020 A1 | * | 4/2004 | ......... F02D 41/1401 |

(Continued)

OTHER PUBLICATIONS

International Search Report for PCT/EP2021/074944, Issued Jan. 10, 2022.

*Primary Examiner* — Ronald D Hartman, Jr.
(74) *Attorney, Agent, or Firm* — NORTON ROSE FULBRIGHT US LLP

(57) ABSTRACT

A computer-implemented method for training a data-based time determining model for determining an opening or closing time of an injection valve based on a sensor signal. The method includes: providing an unlabeled analysis point time series by sampling the sensor signal of a sensor of the injection valve; training the data-based time determining model to assign a time specification which represents a specific opening or closing duration to an analysis point time series, the training process being carried out using a first (Continued)

shifting function to time-shift the analysis point time series and a second shifting function in order to time-shift the time specification. A consistency loss function is used for the training process.

10 Claims, 3 Drawing Sheets

(56) References Cited

U.S. PATENT DOCUMENTS

| | | |
|---|---|---|
| 2007/0203616 A1 | 8/2007 | Borrmann et al. |
| 2023/0222345 A1* | 7/2023 | Groh .................. G06N 3/044 706/15 |
| 2023/0229121 A1* | 7/2023 | Hopf .................. G06N 3/08 700/29 |

FOREIGN PATENT DOCUMENTS

| | | | |
|---|---|---|---|
| DE | 10255364 B4 * | 3/2006 | ............ F02D 41/14 |
| DE | 102007059113 A1 | 6/2009 | |
| DE | 102007063103 A1 | 7/2009 | |
| DE | 102008001560 A1 | 11/2009 | |
| DE | 102015205878 A1 | 10/2016 | |
| DE | 102019209690 A1 | 3/2020 | |
| EP | 1381765 B1 * | 7/2006 | ......... F02D 13/0207 |

* cited by examiner

METHOD AND DEVICE FOR TRAINING A DATA-BASED TIME DETERMINING MODEL FOR DETERMINING AN OPENING OR CLOSING TIME OF AN INJECTION VALVE USING A MACHINE LEARNING METHOD

FIELD

The present invention relates to a method for operating a fuel injection valve of an internal combustion engine using a data-based time determining model, in particular for determining an opening or closing time for estimating an amount of injected fuel.

BACKGROUND INFORMATION

Electromechanical or piezoelectric injection valves are used to meter fuel in internal combustion engines. These valves allow a direct and precisely measured fuel supply into the cylinders of the internal combustion engine.

One challenge is to control the combustion process as accurately as possible in order to improve operating characteristics of the internal combustion engine, in particular in terms of fuel consumption, efficiency, pollutant emissions and smooth running. It is essential to operate the injection valves such that the amount of fuel to be injected can be metered with high repeat accuracy, at varying working pressures, and, if necessary, with multiple injections per stroke.

Injection valves may comprise an electromagnetic actuator or piezo actuator, which actuate a valve needle in order to lift it from a needle seat and to open an exit port of the injection valve to allow the fuel to pass into the combustion chamber. Due to structural differences and varying operating conditions, such as temperature, fuel pressure, fuel viscosity, there is uncertainty in determining the exact opening time, i.e., the time from which fuel enters the combustion chamber of the cylinder through the injection valve, and the exact closing time of the injection valve, i.e., the time up to which fuel enters the combustion chamber of the cylinder through the injection valve.

SUMMARY

The present invention provides a method for training a data-based time determining model for use in an injection system for determining an opening or closing time of an injection valve, as well as a device and an injection system.

Further embodiments of the present invention are disclosed herein.

According to a first aspect of the present invention, a computer-implemented method for training a data-based time determining model for use in an injection system for determining an opening or closing time of an injection valve based on a sensor signal is provided. According to an example embodiment of the present invention, the method comprises the following steps:
  providing at least one unlabeled analysis point time series by sampling a sensor signal of a sensor of the injection valve;
  training the data-based time determining model in order to assign a time specification, which represents a specific opening or closing duration, to an analysis point time series,
    wherein the training process is carried out using a first shifting function for time-shifting the analysis point time series and a second shifting function for time-shifting the time specification,
    wherein a consistency loss function is used for the training process, the consistency loss function indicating a difference between a time specification for the analysis point time series time-shifted according to the first shifting function and a time specification, time-shifted according to the second shifting function, for the at least one analysis point time series.

In particular, the data-based time determining model may be further trained, based on a prediction loss function, on at least one training data set that assigns a respective analysis point time series to a specific time specification as a label.

Although an injection valve is controlled according to a predetermined curve of a control signal, the opening and closing movements of the injection valve caused thereby vary so that the actual opening and closing times for starting and ending the fuel injection cannot be predetermined accurately. This is due to the complex dependencies of the valve movement on the current operating point.

According to an example embodiment of the present invention, in order to monitor the valve movement, a piezo sensor is provided in the injection valves and is designed as a pressure sensor in order to sense the pressure changes of a fuel pressure caused by the controlling of the injection valve and to provide a corresponding sensor signal. The measured sensor signal may now be analyzed to determine the actual opening and closing times of the injection valve in order to adjust the control of the injection valve accordingly.

The analysis point time series is obtained by sampling the sensor signal according to a predetermined sampling rate, wherein the analysis point time series is determined for a predetermined analysis period. The remaining sample values are not part of the analysis point time series.

However, the sensor signal is also noisy and in particular depends on the actual fuel pressure in the fuel supply and the duration of the control to be measured.

According to an example embodiment of the present invention, the analysis of the sensor signal for determining an opening or closing time of the injection valve may be performed using a data-based time determining model. The data-based time determining model may correspond to a neural network, a probabilistic regression model, or any other data-based model.

In order to train the time determining model, analysis point time series may be predetermined, which are each provided with a different label in order to form training data sets. A label corresponds to a specification of an assigned opening or closing time of an injection valve. The training data created in this way are obtained via the measurement on a test rig, wherein for different control signals of the injection valve, which specify different opening durations, analysis point time series are recorded, and the corresponding, actual opening or closing time is determined by a suitable test rig sensor system.

Furthermore, unlabeled analysis point time series may be provided, which map real sensor signal curves determined using the piezo sensor and for which no opening or closing time has been determined.

Based on the unlabeled analysis point time series, the time determining model may now be trained using the consistency loss function. According to an example embodiment of the present invention, two shifting functions are provided for this purpose: a first shifting function for time-shifting the analysis point time series and a second shifting function for time-shifting a modeled time specification.

The first shifting function shifts the indices of the analysis point time series by an integer shift value into the future or into the past and, if necessary, fills the vacant analysis points at the beginning or at the end with corresponding samples of the sensor signal. The second shifting function shifts the time specification accordingly. Thus, according to the time distance, predetermined by the sampling rate, of two consecutive analysis points and the integer shift value, the amount of the shift of the time specification can be determined by the second shifting function.

According to an example embodiment of the present invention, the consistency loss function can evaluate a difference between the modeled first time specification and the modeled second time specification, e.g., in the form of a consistency loss value representing a difference, an L2 norm, or another suitable loss value that evaluates a distance between the first time specification and the second time specification.

According to an example embodiment of the present invention, the prediction loss function can evaluate a difference between a time specification modeled with an analysis point time series and a time specification which is assigned to this analysis point time series and has been determined in a test rig measurement, e.g., in the form of a prediction loss value representing a difference, an L2 norm, or another suitable loss value that evaluates a distance between the modeled time specification and the assigned time specification.

The training of the data-based time determining model may thus be based on the training data sets (labeled analysis point time series) and the unlabeled analysis point time series.

According to an example embodiment of the present invention, the unlabeled analysis point time series may also be determined remotely from the test rig. Thus, the data-based time determining model can be trained on the training data sets from a test rig measurement and can subsequently be retrained, for example in an internal combustion engine/vehicle in operation based on the analysis point time series determined therein depending on the consistency loss function. The training, based on the unlabeled analysis point time series, may be carried out to fine-tune the time determining model previously trained on the training data sets. This can take place with a predetermined number of adjustment steps and a learning rate, i.e., adjustment rate of the model parameters of the data-based time determining model, that is reduced compared to the training on the training data sets.

Furthermore, an overall loss function depending on the consistency loss function and the prediction loss function may be used to train the data-based time determining model, wherein in particular an analysis point time series of the at least one training data set is used or assumed as the at least one unlabeled analysis point time series. Thus, the training on a prediction loss value and a consistency loss value is based on the identical analysis point time series.

The training data sets and the analysis point time series may each be used to train one of two separate neural networks of a twin network.

The training of the data-based time determining model may be continued or discontinued depending on a quality value. In particular, a quality value, which may indicate the quality of the time determining model, may be determined from a plurality of consistency loss values (values of analysis of the consistency loss function) of the trained time determining model depending on an analysis point time series and a plurality of first and corresponding second shifting functions having different shift values. A quality value may be formed from a plurality of consistency loss values (based on an unlabeled analysis point time series) with respect to the different first and associated second shifting functions for a plurality of time-shifted analysis point time series, such as a sum of the consistency loss values or a maximum of the consistency loss values.

If it is determined that the quality value exceeds a predetermined threshold value, one or more new measurements of opening or closing times are performed in order to create one or more training data sets.

According to a further aspect of the present invention, provided is a method for operating an injection valve by determining an opening or closing time of the injection valve based on a sensor signal and a data-based time determining model trained according to the above method, wherein the operation of the injection valve is carried out depending on the opening or closing time, wherein the operation of the injection valve is in particular carried out such that an opening duration of the injection valve, determined by the determined opening and/or closing time, is set to a predetermined target opening duration.

According to a further aspect of the present invention, provided is a device for carrying out the above method.

BRIEF DESCRIPTION OF THE DRAWINGS

Preferred embodiments of the present invention are described in more detail below with reference to the figures.

DETAILED DESCRIPTION OF EXAMPLE EMBODIMENTS

Figure 1:
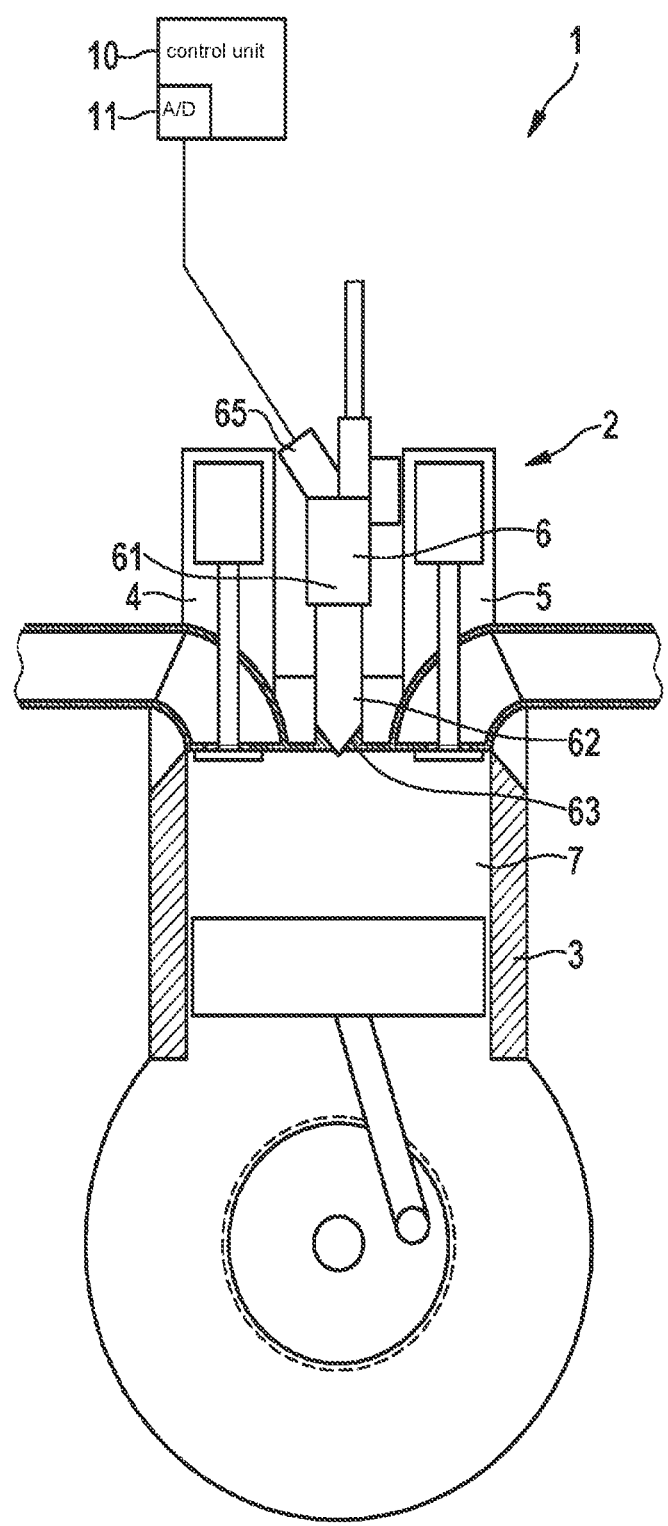
FIG. 1 shows a schematic representation of an injection system for injecting fuel into the cylinder of an internal combustion engine, according to an example embodiment of the present invention.

FIG. 1 shows an arrangement of an injection system 1 for an internal combustion engine 2 of a motor vehicle, for which a cylinder 3 (of in particular a plurality of cylinders) is shown by way of example. The internal combustion engine 2 is preferably designed as a direct-injection diesel engine but may also be provided as a gasoline engine.

The cylinder 3 comprises an intake valve 4 and an exhaust valve 5 for supplying fresh air and exhausting combustion exhaust.

Furthermore, fuel for operating the internal combustion engine 2 is injected into a combustion chamber 7 of the cylinder 3 via an injection valve 6. To this end, fuel is provided to the injection valve via a fuel supply 8, via which fuel is provided in a convention manner (e.g., common rail) under a high fuel pressure.

The injection valve 6 comprises an electromagnetically or piezoelectrically controllable actuator unit 61 coupled to a valve needle 62. In the closed state of the injection valve 6, the valve needle 62 is seated on a needle seat 63. By controlling the actuator unit 61, the valve needle 62 is moved longitudinally and frees a portion of a valve opening in the needle seat 63 in order to inject the pressurized fuel into the combustion chamber 7 of the cylinder 3.

The injection valve 6 furthermore comprises a piezo sensor 65 arranged in the injection valve 6. The piezo sensor 65 is deformed by pressure changes in the fuel conducted by the injection valve 6 generates a voltage signal as a sensor signal.

The injection takes place in a manner controlled by a control unit 10 which specifies an amount of fuel to be injected by energizing the actuator unit 61. The sensor signal is sampled over time using an A/D converter 11 in the control unit 10, in particular at a sampling rate of 0.5 to 5 MHz.

In operation of the internal combustion engine 2, the sensor signal is used to determine a correct opening and/or closing time of the injection valve 6. For this purpose, the sensor signal is digitized into a sensor signal time series using the A/D converter 11 and is analyzed by a suitable analysis model, from which an opening duration of the injection valve 6 and, accordingly, an injected amount of fuel can be determined depending on the fuel pressure and further operating parameters. In particular, in order to determine the opening duration, an opening time and a closing time are needed to determine the opening duration as the time difference of these parameters.

An opening time and/or a closing time may be determined from the consideration of the sensor signal curve. In particular, the opening time or the closing time may be carried out using a data-based time determining model.

In addition to training data sets obtained from a measurement, unlabeled analysis point time series may also be used to train the data-based time determining model.

Figure 2:
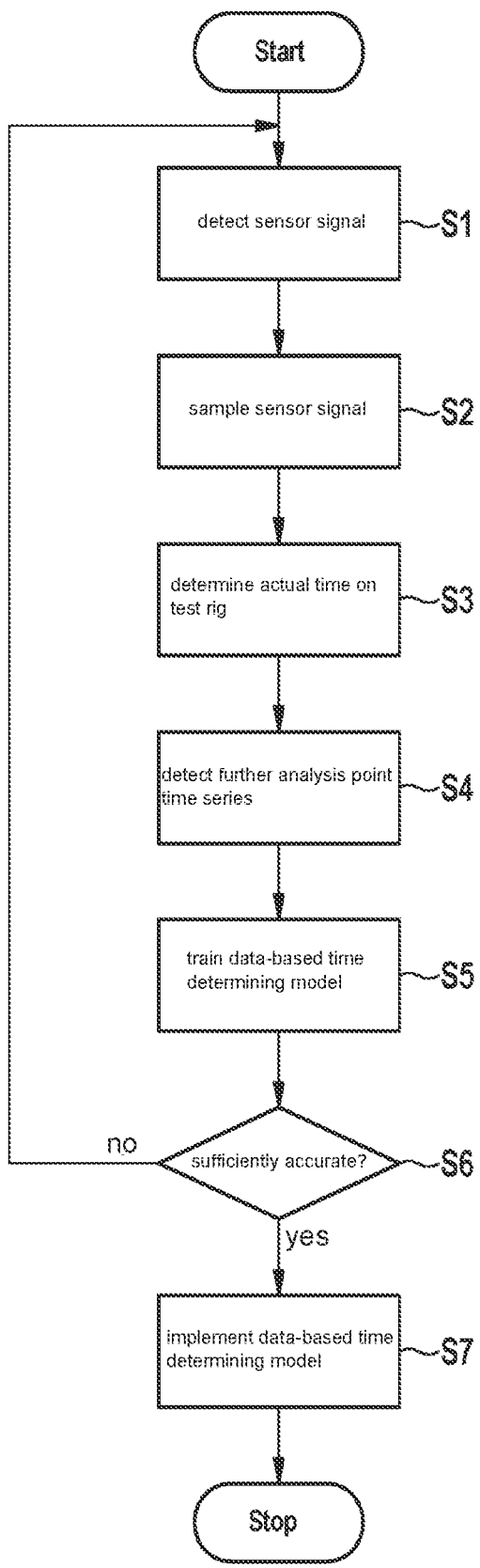
FIG. 2 shows a flowchart to represent a method for training a data-based time determining model for determining an opening or closing time of an injection valve, according to an example embodiment of the present invention.

FIG. 2 illustrates, using a flowchart, a method for training such a data-based time determining model, which may be used in operation in an engine system 1 described above to determine an opening or closing time of an injection valve 6 of a cylinder 3. The method may be carried out in a controller of a test rig. The test rig allows injection valves in an engine system to be measured so that, depending on a control signal for the actuator unit 61, a corresponding opening and/or closing time can be accurately detected using an additional sensor system. The sensor signal of the piezo sensor 65 is sampled for this purpose and a correspondingly sampled analysis point time series is detected at a resolution of, for example, between 5 and 20 µs.

In step S1, a sensor signal is detected using the piezo sensor 65. This signal is generally a voltage signal generated due to pressure changes in the supplied fuel.

In step S2, the sensor signal is sampled using the A/D converter 11 in order to determine an analysis point time series within an analysis period. The analysis period may be set with respect to a control time window of the injection valve. The control time window is defined by the start of the control of the actuator unit 61 and a set duration, which corresponds to a maximum duration, in which the control signal specifies a valve opening for the actuator unit 61. The control time window thus has a defined time reference for which an analysis point time series is provided, which is the basis for the further determination of an opening or closing time. In particular, the analysis point time series may be determined by downsampling the previously oversampled sensor signal.

Figure 4:
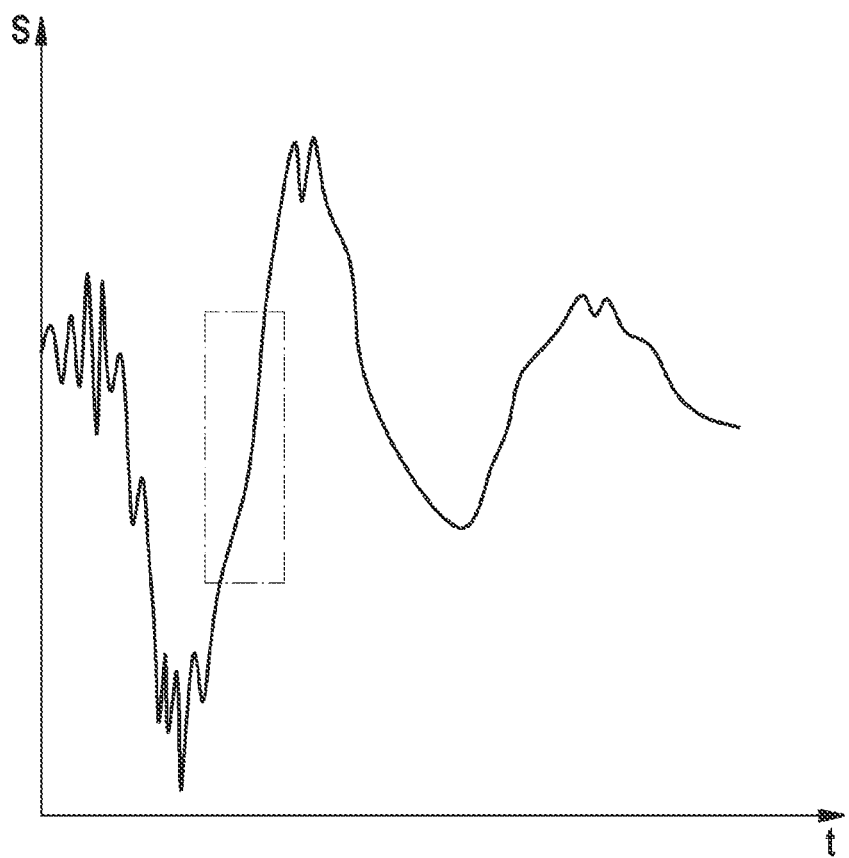
FIG. 4 shows an exemplary representation of an analysis point time series, according to an example embodiment of the present invention.

The analysis period may be provided with a fixed time reference to the strokes of the internal combustion engine 2; in particular, the analysis period may begin at a predetermined crankshaft position, preferably within the compression stroke. The analysis period may be selected such that the entire opening time window of the injection valve 6 can be mapped therein. Such an analysis period with an exemplary analysis point time series is shown in FIG. 4.

In step S3, according to a test rig sensor system, an actual time is determined on a test rig as the opening or closing time for an analysis point time series. This time is assumed to be the label for the previously determined associated analysis point time series so that a training data set is formed.

In step S4, further analysis point time series may be detected without a corresponding time being determined as the opening or closing time. Thus, training data sets as well as unlabeled analysis point time series are available for the training process.

In step S5, training of the data-based time determining model takes place based on both the training data sets and the unlabeled analysis point time series. The analysis point time series underlying a training data set may also be simultaneously provided as an unlabeled analysis point time series.

The training may be carried out in a convention manner, based on a loss function mapping a model quality for an input vector. A common training method in this respect is backpropagation.

The training may take place alternately on training data sets and on the unlabeled analysis point time series. To this end, a prediction loss value may be determined in the form of a prediction quality based on the training data sets. The prediction quality may depend on a modeled time specification and a time specification assigned to the analysis point time series of the training data set. In particular, the model quality may correspond to a difference of the modeled time and the assigned time specification, an L2 norm, or a result of any other distance determination.

Figure 3:
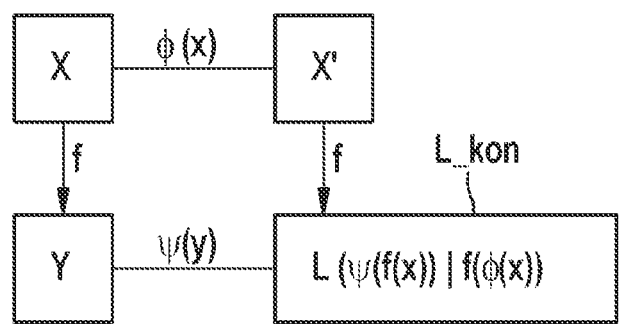
FIG. 3 shows a block diagram for illustrating the determination of a consistency loss value from unlabeled analysis point time series, according to an example embodiment of the present invention.

Furthermore, a consistency loss value may be determined from the analysis point time series and using the predetermined first and second shifting functions. In connection with the block representation of FIG. 3, the procedure is described below.

To this end, a first shifting function $\Phi(x)$ is applied to a predetermined unlabeled analysis point time series X and shifts the analysis point time series by one or more element positions according to an integer shift value. This may, for example, be carried out by respectively changing the index values of the elements of the analysis point time series by the integer shift value and subsequently completing the missing index values at the beginning or at the end of the analysis point time series with corresponding sample values of the sensor signal. For example, the analysis point time series may be time-shifted by n analysis points/sampling points into the future so that the first n elements of the analysis point time series must be set to any new values. The last n analysis points of the original analysis point time series X are discarded in the process. The resulting time-shifted analysis point time series corresponds to $X'=\Phi(X)$.

The time-shifted analysis point time series X' is supplied to the time determining model f in order to obtain a first comparison value $f(\Phi(X))$.

According to the time determining model f, a modeled time specification $Y=f(X)$ is generated from the original analysis point time series X.

A second shifting function $\Psi(Y)$ is defined, which shifts the modeled time specification by a corresponding duration resulting from the shift value n of the first shifting function $\Phi(X)$. Assuming that the analysis points of the analysis point time series are evenly spaced over time, e.g., at a time increment of Δt, the second shifting function Ψ(Y) shifts the time to be determined by +n×Δt, i.e., an offset of n×Δt is applied to the time specification.

From the modeled time specification Y, a second comparison value Ψ(f(X)) is determined according to the second shifting function.

The consistency loss value L_kon now results from a deviation between the shifted modeled time Ψ(f(x)) and the model value of the shifted analysis point time series f(Φ(x)) according to L_kon=L(f(Φ(x)), Ψ(f(x))).

This consistency loss value L_kon can now be used to train the data-based time determining model, e.g., with a backpropagation algorithm. While initial training takes place on a test rig in order to obtain training data sets with labeled analysis point time series, re-training of the data-based time determining model may also take place during the use of the injection valve in the engine system, based on unlabeled analysis point time series, i.e., based only on the consistency loss function. As a result, the training data sets obtained on the test rig may be used to pre-train the data-based time determining model, with the model being re-trained using the unlabeled analysis point time series.

In step S6, it may be verified whether the data-based time determining model is sufficiently accurate. This may be determined, for example, by determining corresponding consistency loss values based on an analysis point time series for a plurality of first and second shifting functions that implement different time offsets for an unlabeled analysis point time series.

A quality value based on determined consistency loss values can now be created, e.g., as the sum of the determined consistency loss values or as the maximum of the determined consistency loss values, and a threshold value comparison can be used to verify whether the consistency of the data-based time determining model is sufficient to end the training process. If this is the case (alternative: yes), in step S7, the data-based time determining model is implemented in the control unit 10 of the engine system, otherwise the method returns to step S1 and one or more broader training data sets are determined on the test rig.

The quality value may be determined by determining a plurality of consistency loss values of the trained time determining model, which result from the consistency loss function depending on one of the at least one unlabeled analysis point time series and a plurality of first and corresponding second shifting functions having different shift values n.

A further option of training the time determining model is explained below. Here, the time determining model is designed as a classification model in order to output a logit as the time specification. For training, training data sets are artificially generated by assigning random labels, i.e., random specific time specifications, as possible opening or closing times of the injection valve to analysis point time series. The time determining model is then trained on these training data sets for a few steps that do not result in the model converging. Subsequently, the labels of the training data are re-determined by taking the labels output by the preceding specific function. This process is iterated so that the thus generated labels converge at the times to be trained. In this process, the unlabeled and the labeled analysis point time series are used together. It can then be evaluated how well the analysis point time series of the training data sets (labeled) predicted the assigned opening or closing time. If the trained time determining model makes sufficiently good predictions, opening and closing times from the training data sets are assigned to the learned classes. A further part of the unlabeled analysis point time series is used to determine the consistency loss value and to further train the time determining model.

In another embodiment, the data-based time determining model may also be designed as a twin network, wherein a first sub-network of the twin network is trained on the training data sets based on the prediction loss function and the second sub-network of the twin network is trained on the unlabeled analysis point time series based on the consistency loss function. In the trained twin network, the parameters of the two sub-networks are shared by weight sharing.

What is claimed is:

1. A computer-implemented method for training a data-based time determining model for determining an opening or closing time of an injection valve based on a sensor signal, the method comprising the following steps:
    providing at least one unlabeled analysis point time series by sampling the sensor signal of a sensor of the injection valve; and
    training the data-based time determining model in order to assign a time specification, which represents a specific opening or closing duration, to an analysis point time series, wherein the training process is carried out using a first shifting function for time-shifting the analysis point time series and a second shifting function for time-shifting the time specification, wherein a consistency loss function is used for the training process, the consistency loss function indicating a difference between a first time specification, which corresponds to a model output of the time determining model for the analysis point time series time-shifted according to the first shifting function, and a second time specification, which specifies a time specification which is time-shifted according to the second shifting function and corresponds to a model output of the time determining model for the at least one analysis point time series.

2. The method according to claim 1, wherein the data-based time determining model may be further trained, based on a prediction loss function, on at least one training data set that assigns a respective analysis point time series to a specific time specification as a label.

3. The method according to claim 2, wherein an overall loss function depending on the consistency loss function and the prediction loss function is used to train the data-based time determining model, wherein the at least one analysis point time series corresponds to the analysis point time series of the training data set.

4. The method according to claim 2, wherein the data-based time determining model is alternately trained on the unlabeled analysis point time series according to the consistency loss function and on the at least one training data set according to the prediction loss function.

5. The method according to claim 2, wherein the data-based time determining model is pre-trained on the at least one training data set according to the prediction loss function and is re-trained on the unlabeled analysis point time series according to the consistency loss function.

6. The method according to claim 2, wherein in the unlabeled analysis point time series corresponds to one of the at least one analysis point time series of the training data set.

7. The method according to claim 2, wherein the training of the data-based time determining model is continued or discontinued depending on a quality value, which indicates a quality of the time determining model, wherein a plurality of consistency loss values of the trained time determining model are determined, which result from the consistency loss function depending on one of the at least one unlabeled analysis point time series and a plurality of first and corresponding second shifting functions having different shift values, wherein in particular the quality value corresponds to a sum of the consistency loss values or a maximum of the consistency loss values.

8. A method for operating an injection valve by determining an opening or closing time of the injection valve based on a sensor signal and a trained data-based time determining model, the data-based time determining model being trained by:
   providing at least one unlabeled analysis point time series by sampling the sensor signal of a sensor of the injection valve, and
   training the data-based time determining model in order to assign a time specification, which represents a specific opening or closing duration, to an analysis point time series, wherein the training process is carried out using a first shifting function for time-shifting the analysis point time series and a second shifting function for time-shifting the time specification, wherein a consistency loss function is used for the training process, the consistency loss function indicating a difference between a first time specification, which corresponds to a model output of the time determining model for the analysis point time series time-shifted according to the first shifting function, and a second time specification, which specifies a time specification which is time-shifted according to the second shifting function and corresponds to a model output of the time determining model for the at least one analysis point time series;
   wherein the method comprises:
   carrying out operation of the injection valve depending on the determined opening and/or closing time, wherein the operation of the injection valve is carried out such that an opening duration of the injection valve, determined by the determined opening and/or closing time, is set to a predetermined target opening duration.

9. A device configured to train a data-based time determining model for determining an opening or closing time of an injection valve based on a sensor signal, the device configured to:
   provide at least one unlabeled analysis point time series by sampling the sensor signal of a sensor of the injection valve; and
   train the data-based time determining model in order to assign a time specification, which represents a specific opening or closing duration, to an analysis point time series, wherein the training process is carried out using a first shifting function for time-shifting the analysis point time series and a second shifting function for time-shifting the time specification, wherein a consistency loss function is used for the training process, the consistency loss function indicating a difference between a first time specification, which corresponds to a model output of the time determining model for the analysis point time series time-shifted according to the first shifting function, and a second time specification, which specifies a time specification which is time-shifted according to the second shifting function and corresponds to a model output of the time determining model for the at least one analysis point time series.

10. A non-transitory computer-readable medium on which are stored instructions for training a data-based time determining model for determining an opening or closing time of an injection valve based on a sensor signal, the instructions, when executed by a computer, causing the computer to perform the following steps:
   providing at least one unlabeled analysis point time series by sampling the sensor signal of a sensor of the injection valve; and
   training the data-based time determining model in order to assign a time specification, which represents a specific opening or closing duration, to the analysis point time series, wherein the training process is carried out using a first shifting function for time-shifting the analysis point time series and a second shifting function for time-shifting the time specification, wherein a consistency loss function is used for the training process, the consistency loss function indicating a difference between a first time specification, which corresponds to a model output of the time determining model for the analysis point time series time-shifted according to the first shifting function, and a second time specification, which specifies a time specification which is time-shifted according to the second shifting function and corresponds to a model output of the time determining model for the at least one analysis point time series.

* * * * *